US008879399B2

(12) United States Patent
Sharma et al.

(10) Patent No.: US 8,879,399 B2
(45) Date of Patent: Nov. 4, 2014

(54) METHOD AND SYSTEM FOR MANAGING DATA TRANSFER

(75) Inventors: Neha Sharma, Bangalore (IN); Vinay Kumar Shrivastava, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/363,386

(22) Filed: Jan. 30, 2009

(65) Prior Publication Data

US 2009/0219828 A1 Sep. 3, 2009

(30) Foreign Application Priority Data

Feb. 1, 2008 (IN) .............................. 265/CHE/2008

(51) Int. Cl.
*H04L 12/26* (2006.01)
*H04J 3/16* (2006.01)
*H04L 1/16* (2006.01)
*H04L 1/12* (2006.01)

(52) U.S. Cl.
CPC ......... *H04L 1/1685* (2013.01); *H04L 2001/125* (2013.01)
USPC .......................................... 370/241; 370/346

(58) Field of Classification Search
None
See application file for complete search history.

(56) References Cited

U.S. PATENT DOCUMENTS

| 5,673,259 | A | 9/1997 | Quick, Jr. |
| 6,643,813 | B1 | 11/2003 | Johansson et al. |
| 2005/0259583 | A1 | 11/2005 | Froc et al. |
| 2006/0056441 | A1* | 3/2006 | Jiang ............................. 370/449 |
| 2006/0245430 | A1* | 11/2006 | Jiang ............................. 370/394 |
| 2006/0251105 | A1* | 11/2006 | Kim et al. ..................... 370/449 |
| 2007/0091810 | A1* | 4/2007 | Kim et al. ..................... 370/236 |
| 2007/0277074 | A1 | 11/2007 | Yeo et al. |
| 2008/0285583 | A1* | 11/2008 | Jiang ............................. 370/449 |
| 2009/0197646 | A1* | 8/2009 | Tamura et al. ................ 455/561 |
| 2009/0221242 | A1 | 9/2009 | Bergstrom et al. |
| 2010/0046518 | A1* | 2/2010 | Takagi et al. ................. 370/392 |

FOREIGN PATENT DOCUMENTS

| EP | 1 755 355 A1 | 2/2007 |
| JP | 2002-537723 A | 11/2002 |
| JP | 2006-014286 A | 1/2006 |
| JP | 2006-522560 A | 9/2006 |
| JP | 2007-520113 A | 7/2007 |
| RU | 2 209 528 C2 | 7/2003 |
| WO | 2006-118418 A2 | 11/2006 |
| WO | 2007-120107 A2 | 10/2007 |

OTHER PUBLICATIONS

3GPP TS 25.322 V8.0.0, 3rd Geceration Partnership Project; Technical Specification Group Radio Access Network; Radio Link Control (RLC) protocol specification (Release 8), (Dec. 2007), p. 27, p. 36, p. 40, p. 48, URL http://www.3gpp.org/ftp/Specs/archive/25_series/25.322/25433-800.zip.

* cited by examiner

*Primary Examiner* — Jutai Kao
(74) *Attorney, Agent, or Firm* — Jefferson IP Law, LLP

(57) ABSTRACT

A method and a system for managing data transfer are provided. The method includes receiving a poll request for a status report on Protocol Data Units (PDUs) transmitted sequentially during the data transfer, determining a status reporting range of the PDUs to be accounted in the status report based on a sequence number in the poll request, and providing the status report with status information on a receipt or a loss of the PDUs within the status reporting range during the data transfer.

8 Claims, 3 Drawing Sheets

METHOD AND SYSTEM FOR MANAGING DATA TRANSFER

PRIORITY

This application claims the benefit under 35 U.S.C. §119(a) of an Indian patent application filed on Feb. 1, 2008 in the Indian Intellectual Property Office and assigned Serial No. 265/CHE/2008, the entire disclosure of which is hereby incorporated by reference.

BACKGROUND OF THE INVENTION

1. Field of the Invention

The present invention relates to a method and system for managing data transfer. More particularly, the present invention relates to a method and system for managing data transfer by providing a status report based on a poll request with status information on a receipt or a loss of Protocol Data Units (PDUs).

2. Description of the Related Art

When transmitting data, the data can be in the form of generated Protocol Data Units (PDUs) in a radio interface architecture of a wireless communication system. The PDUs transmitted by a transmitter can be lost during transmission over a channel without reaching a receiver. For example, the transmitter polls the receiver with a request for a status report on PDUs transmitted. Once the request is received, the receiver transmits the status report of the PDUs received. However, the transmitter may not receive the status report on the PDUs due to the PDUs being lost during the transmission over the channel from the receiver. The transmitter then repeats polling the receiver with a request for the status report on PDUs transmitted, which results in a deadlock situation. Moreover, a delay in sending the status report on lost PDUs from the receiver to the transmitter may delay retransmission of the lost PDUs from the transmitter.

Therefore, a need exists for a method and system for managing data transfer efficiently.

SUMMARY OF THE INVENTION

An aspect of the present invention is to address at least the above-mentioned problems and/or disadvantages and to provide at least the advantages described below. Accordingly, an aspect of the present invention is to provide a method and system for managing data transfer.

In accordance with an aspect of the present invention, a method for managing data transfer is provided. The method includes receiving a poll request for a status report on one or more Protocol Data Units (PDUs) transmitted sequentially during the data transfer, determining a status reporting range of the PDUs to be accounted in the status report based on a sequence number in the poll request, and providing the status report with status information on a receipt or a loss of the PDUs within the status reporting range during the data transfer.

In accordance with another aspect of the present invention, a system for managing data transfer is provided. The system includes a communication device for sending a poll request for a status report on Protocol Data Units (PDUs) transmitted sequentially during the data transfer, and an electronic device for providing the status report to the communication device based on a sequence number in the poll request.

In accordance with still another aspect of the present invention, an electronic device for providing status report on at least one Protocol Data Unit (PDU) during data transfer is provided. The device includes a communication interface for communicating with a communication device, and a processor for determining a status reporting range of the PDUs to be accounted in the status report based on a sequence number and providing the status report with status information on a receipt or a loss of the PDUs within the status reporting range to the communication device.

Other aspects, advantages and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention described herein provide a method and system for managing data transfer.

Figure 1:
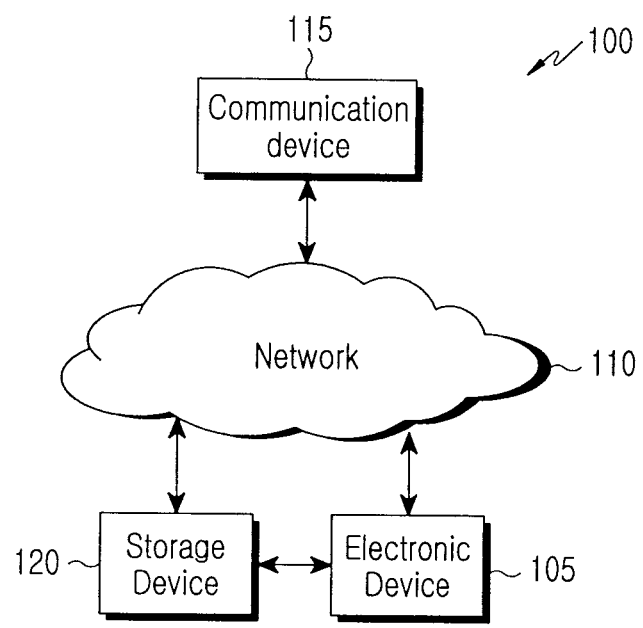
FIG. 1 is a block diagram of a system for managing data transfer according to an exemplary embodiment of the present invention.

FIG. 1 is a block diagram of a system for managing data transfer 100 according to an exemplary embodiment of the present invention. The system 100 includes an electronic device 105 connected through a network 110 to a communication device 115. The electronic device 105 is used for providing a status report to the communication device 115 based on a sequence number in a poll request. The communication device 115 is used for sending a poll request for a status report on Protocol Data Units (PDUs) transmitted sequentially during the data transfer.

Examples of the electronic device may include, but are not limited to, computers, laptops, palmtops, mobiles, Personal Digital Assistants (PDAs) and the like, through which the status report on the PDUs may be provided. The communication device 115 may include, but is not limited to, computers, laptops, palmtops, mobiles, PDAs and the like, through which a poll request for the status report may be transmitted. The network 110 may include, but is not limited to, an Internet protocol Multimedia Subsystem (IMS) network, a General a Packet Radio Service (GPRS) network, a Global System for Mobile (GSM) communication network, a Local Area Network (LAN), a Wide Area Network (WAN), a Metropolitan Area Network (MAN), the Internet, Bluetooth, ZigBee technology, a wireless network and the like. The wireless network may include, but is not limited to a Universal Mobile Telecommunication System (UMTS) Terrestrial Radio Access Network (UTRAN).

The electronic device 105 may also be connected to a storage device 120 directly or through the network 110. In an exemplary embodiment of the present invention, the storage device 120 may be incorporated within the electronic device 105. The storage device 120 may include, but is not limited to, a flash drive, a hard disk and the like for storing data. The storage device 120 may store the PDUs obtained sequentially during the data transfer from the communication device 115.

In an exemplary embodiment of the present invention, communication between the communication device 115 and the electronic device 105 through the network 110 is facilitated using a Radio Link Control (RLC) protocol. The RLC protocol exists in the communication device 115 for transmitting the PDUs and a corresponding RLC entity exists in the electronic device 105 for receiving the PDUs. A radio interface protocol layer corresponding to the RLC protocol in the communication device 115 or the electronic device 105 includes a Data Link Layer (DLL) above a Physical Layer (PL). The DLL has two sub layers, such as an RLC layer and a Medium Access Control (MAC) layer. A Service Access Point (SAP) is provided between layers and the sub layers of the electronic device 105 to facilitate peer-to-peer communication between the layers and the sub layers. The SAP between the MAC layer and the PL provides transport channels for communication between the layers. The SAP between the RLC layer and the MAC sub layer provides logical channels for communication between the layers. The RLC layer provides three types of Session Access Points (SAPs) that include an Acknowledged Mode (AM) RLC operation, an Unacknowledged Mode (UM) RLC operation and Transparent Mode (TM) RLC operation, respectively.

In an exemplary implementation, the AM RLC operation may enable one or more functionalities. For example, the functionalities may include in-sequence delivery of higher layer PDUs, duplicate detection of the PDUs, error correction of the PDUs and ciphering of the PDUs.

The RLC layer receives a unit of data from the layers for transmission in the AM RLC operation. The unit of data includes a payload or a Service Data Unit (SDU). The SDU is one of segmented and concatenated to PDU. The RLC adds control information to the SDU which includes a header. The header combined with the SDU received from the upper layers includes a PDU. The header includes an RLC PDU Sequence Number (SN). The PDUs are transmitted from a communication device to the electronic device 105 through an AM RLC protocol mechanism. The RLC layer is responsible for reliable transmission of the SDUs received from the upper layers.

The PDUs transmitted or to be transmitted from the communication device 115 are maintained in a transmission window (TX_WINDOW) in the communication device 115. The PDUs received or to be received at the electronic device 105 are maintained in a reception window (RX_WINDOW) in the electronic device 105. To maintain the TX_WINDOW operations, variables VT(A), VT(S) and VT(MS) are maintained by the communication device 115. The variables are defined in Table 1.

TABLE 1

| | |
|---|---|
| VT(A) | Sequence number of first yet to be acknowledged PDU (lower edge of the TX_WINDOW) |
| VT(S) | Sequence number of first PDU yet to be transmitted |
| VT(MS) | Upper edge of the TX_WINDOW |

To maintain the RX_WINDOW, variables VR(R), VR(H) and VR(MR) are maintained by the electronic device 105. The variables are defined in Table 2.

TABLE 2

| | |
|---|---|
| VR(R) | Sequence number of first missing PDU (lower edge of RX_WINDOW) |
| VR(H) | Highest expected sequence number of PDU (one ahead of highest sequence number of PDU received so far) |
| VR(MR) | Upper edge of RX_WINDOW |

The PDUs are transmitted from the TX-WINDOW in the communication device 115 to the RX_WINDOW in the electronic device 105. New data PDUs to be transmitted are added from an upper edge of the TX_WINDOW from the VT(S). The PDUs received in sequence are added from a lower edge of the RX_WINDOW. The new PDUs received are appended in the RX_WINDOW and arranged according to sequence numbers associated with the PDUs.

In an exemplary embodiment of the present invention, communication between the communication device 115 and the electronic device 105 through the network 110 is facilitated using a Logical Link Control (LLC) protocol. The LLC protocol exists in the communication device 115 for transmitting the PDUs and a corresponding LLC protocol exists in the electronic device 105 for receiving the PDUs.

Figure 2:
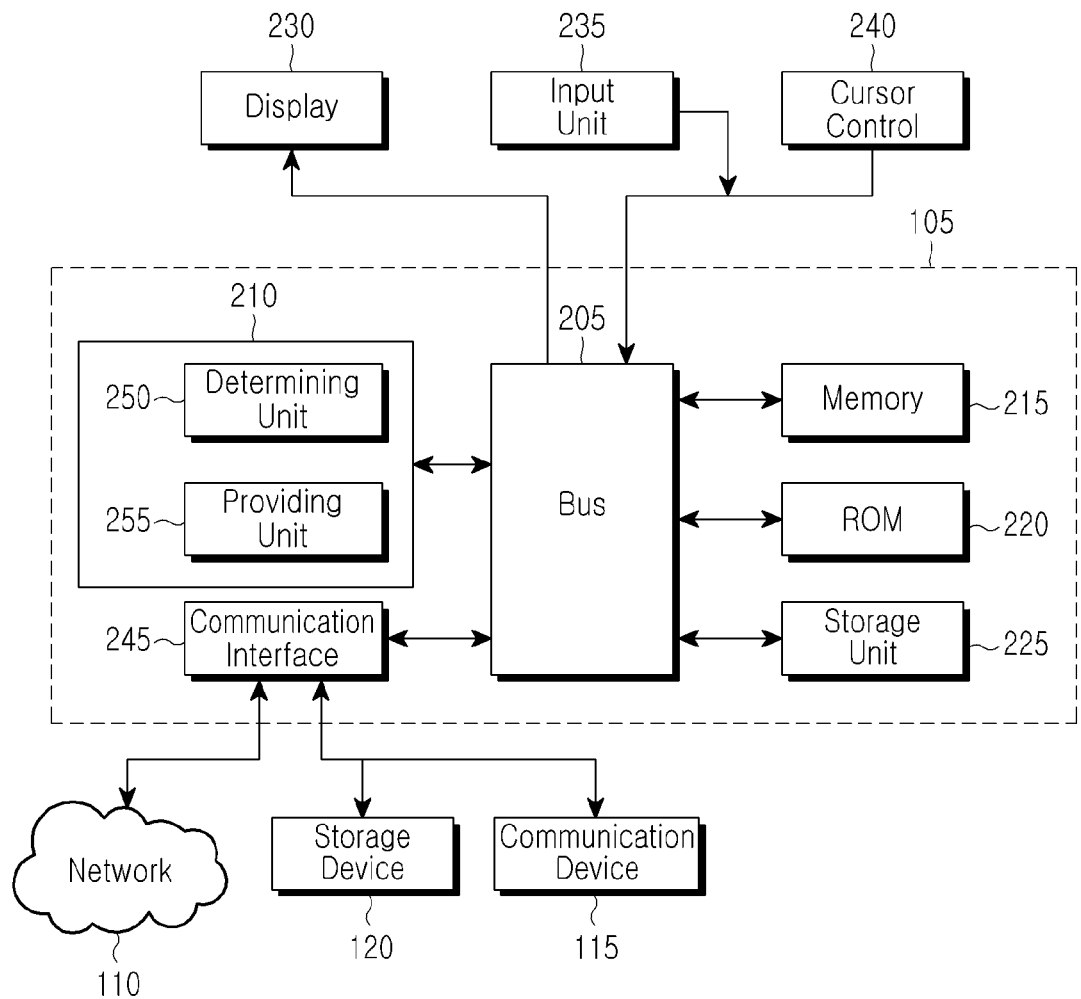
FIG. 2 is a block diagram of an electronic device according to an exemplary embodiment of the present invention.

FIG. 2 is a block diagram of the electronic device 105 according to an exemplary embodiment of the present invention. The electronic device 105 includes a bus 205 or other communication mechanisms for communicating information. The electronic device 105 includes a processor 210 coupled with the bus 205. The processor 210 may include an integrated electronic circuit for processing and controlling functionalities of the electronic device 105. The electronic device 105 also includes a memory 215, such as a Random Access Memory (RAM) or other dynamic storage devices, coupled to the bus 205 for storing information which may be used by the processor 210. The memory 215 may be used for storing any temporary information required. The electronic device 105 further includes a Read Only Memory (ROM) 220 or other static storage devices coupled to the bus 205 for storing static information for the processor 210. A storage unit 225, such as a magnetic disk, an optical disk and the like, is provided and coupled to the bus 205 for storing information.

Referring to FIG. 2, the electronic device 105 may be coupled via the bus 205 to a display 230, such as a Cathode Ray Tube (CRT), a Liquid Crystal Display (LCD) or a Light Emitting Diode (LED) display, for displaying information to a user. An input unit 235, including alphanumeric and other keys, is coupled to the bus 205 for communicating an input to the processor 210. The input unit 235 may be included in the electronic device 105. The electronic device 105 includes other types of user input units, for example, a cursor control 240, such as a mouse, a trackball, cursor direction keys for communicating the input to the processor 210 and for controlling cursor movement on the display 230 and the like. The input unit 235 may also be included in the display 230, for example, a touch screen.

Various exemplary embodiments are related to the use of the electronic device 105 for implementing techniques described herein. In an exemplary implementation, the techniques are performed by the processor 210 using information included in the memory 215. The information may be read into the memory 215 from another machine-readable medium, such as the storage unit 225.

The term "machine-readable medium" as used herein denotes any medium that participates in providing data that causes a machine to operate in a specific fashion. For example, the electronic device 105 and various machine-readable medium are involved in providing information to the processor 210. The machine-readable medium may be a storage media. Storage media includes both non-volatile media and volatile media. Non-volatile media includes, for example, optical or magnetic disks, such as the storage unit 225. Volatile media includes dynamic memory, such as the memory 215. The media must be tangible to enable the information carried by the media to be detected by a physical mechanism that reads the information into a machine.

Common forms of machine-readable medium include, for example, a floppy disk, a flexible disk, hard disk, magnetic tape or any other magnetic medium, a CD-ROM, any optical medium, punchcards, papertape, any physical medium with patterns of holes, a RAM, a Programmable Read-Only Memory (PROM), Erasable Programmable Read-Only Memory (EPROM), a FLASH-EPROM, a memory chip, a cartridge and the like.

In an exemplary embodiment of the present invention, the machine-readable medium may be a transmission media including coaxial cables, copper wire and fiber optics, including the wires that include the bus 205. Transmission media may also take the form of acoustic or light waves, such as those generated during radio-wave and infra-red data communications.

The electronic device 105 also includes a communication interface 245 coupled to the bus 205. The communication interface 245 provides two-way data communication coupling to the network 110. For example, the communication interface 245 may be a LAN card to provide a data communication connection to a compatible LAN. Wireless links may also be implemented. In an exemplary implementation, the communication interface 245 transmits and receives electrical, electromagnetic or optical signals that carry digital data streams representing various types of information. The communication interface 245 may be a universal serial bus port. Communication between the electronic device 105 and the communication device 115 may be through the communication interface 245 and the network 110.

Still referring to FIG. 2, the processor 210 may include one or more processing units, for example, a determining unit 250 and a providing unit 255. The determining unit 250 is used for determining a status reporting range of one or more PDUs to be accounted in a status report based on a sequence number received in a poll request. The providing unit 255 is used for providing the status report with status information on a receipt or a loss of the PDUs within the status reporting range to the communication device 115. The processing units may be hardware circuitry which performs desired functions.

In an exemplary implementation, the storage unit 225, such as, a hard disk may be used for storing the PDUs obtained sequentially. The electronic device 105 may access the PDUs directly from the storage unit 225 or from a storage device 120 through the communication interface 245.

The providing unit 255 may utilize the storage device 120 or the storing unit 225 for providing the status report.

Figure 3:
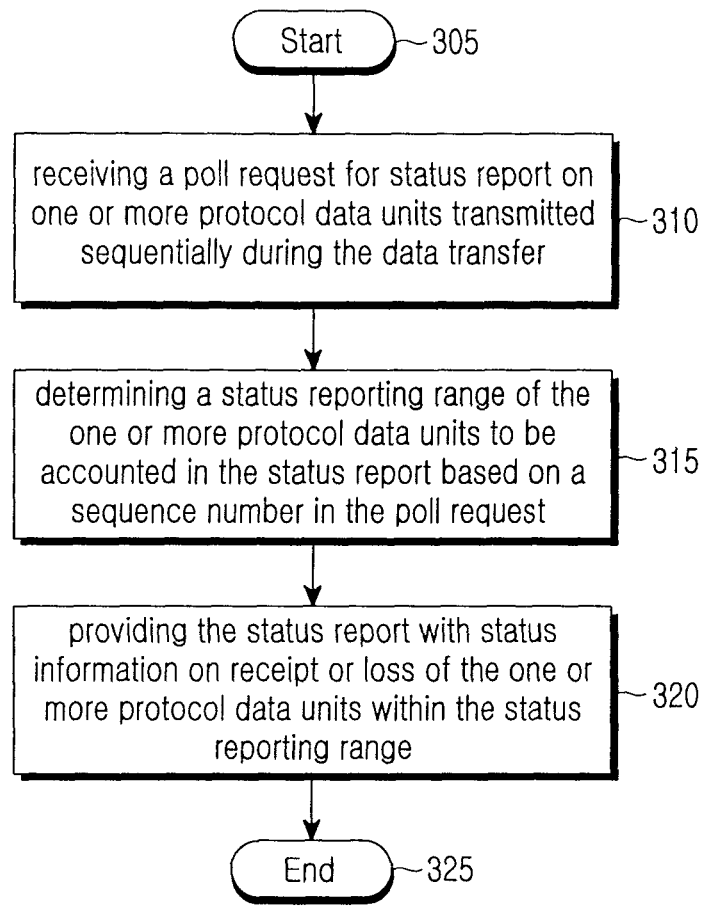
FIG. 3 illustrates a method for managing data transfer according to an exemplary embodiment of the present invention.

FIG. 3 illustrates a method for managing data transfer according to an exemplary embodiment of the present invention.

The method starts in step 305.

In step 310, a poll request for a status report on one or more PDUs transmitted sequentially during the data transfer is received. The poll request includes a sequence number associated with a PDU transmitted prior to the sending the poll request.

In an exemplary implementation, a control PDU, herein referred to as "poll super field (POLL SUFI)" is transmitted in a poll request to provide the status report on the PDUs transmitted sequentially. The POLL SUFI is characterized by a "type" field and a "poll sequence (POLL_SN)" field. The "type" field identifies the SUFI is a type of poll and the "POLL_SN" field indicates the sequence number associated with a PDU transmitted prior to the transmitting of the poll request. For example, if a PDU with sequence number 36 is transmitted and the PDUs with the sequence numbers is less than the sequence number 31 associated with a PDU are acknowledged, then a POLL SUFI with the sequence number 36 may be sent to provide the status report of the PDUs transmitted with sequence numbers starting from 31 to 36.

Still referring to FIG. 3, in step 315, a status reporting range of the PDUs to be accounted in the status report is determined based on the sequence number in the poll request. An upper limit of the status reporting range is determined by comparing the sequence number in the poll request with a sequence number associated with a PDU of the PDUs expected in sequence after receiving the poll request. A lower limit of the status reporting range by identifying a sequence number associated with a PDU of the PDUs lost during the data transfer.

In an exemplary implementation, if the sequence number in the poll request is greater than or equal to the sequence number associated with the PDU of the PDUs expected in sequence, then the status reporting range includes the PDUs with sequence numbers between the sequence number associated with the PDU of the PDUs lost during the data transfer and the sequence number in the poll request. The upper limit of the status reporting range may correspond to the sequence number in the poll request.

For example, the sequence number associated with the PDU of the PDUs expected in sequence is 35, the sequence number associated with the PDU lost during the data transfer is 32 and the sequence number in the poll request is 36. The status reporting range may then include the PDUs between sequence numbers 32 and 36, since the sequence number 36 is greater than the sequence number 35.

In an exemplary implementation, if the sequence number in the poll request is less than the sequence number associated with the PDU of the PDUs expected in sequence, then the status reporting range includes the PDUs with sequence numbers from the sequence number associated with the PDU of the PDUs lost during the data transfer to the sequence number associated with the PDU of the PDUs expected in sequence.

The sequence number associated with the PDU of the PDUs expected in sequence may be excluded from the status reporting range. The upper limit of the status reporting range may then correspond to a PDU with a sequence number that is one number less than the sequence number associated with the PDU of the PDUs expected in sequence, if the sequence number in the poll request is less than the sequence number associated with the PDU expected in sequence.

For example, the sequence number associated with the PDU of the PDUs expected in sequence is 35, the sequence number associated with the PDU lost during the data transfer is 32 and the sequence number in the poll request is 34. The status reporting range may then include the PDUs between sequence numbers 32 and 35, since the sequence number 35 is greater than the sequence number 34.

Increments of the sequence number in the poll request and the sequence number associated with the PDU of the PDUs expected in sequence may be used for comparison. The status reporting range may then be determined based on the comparison.

In an exemplary implementation, the sequence number associated with the PDU of the PDUs expected in sequence after receiving the poll request is updated corresponding to the sequence number in the poll request based on the comparison. In order to update the sequence number of the PDU expected in sequence, the incremented sequence number in the poll request and the sequence number of the PDU expected in sequence are compared. The updated sequence number of the PDU expected in sequence may correspond to the incremented sequence number in the poll request, if the incremented sequence number in the poll request is greater than the sequence number of the PDU expected in sequence. The updated sequence number of the PDU expected in sequence may correspond to the incremented sequence number of the PDU expected in sequence, if the incremented sequence number in the poll request is less than the sequence number of the PDU expected in sequence. The status reporting range is extended based on the update. The upper limit of the status reporting range may then correspond to the updated sequence number associated with the PDU of the PDUs expected in sequence.

The updated sequence number may be excluded from the status reporting range. The upper limit of the status reporting range may then correspond to a PDU with a sequence number that is one number less than the updated sequence number associated with the PDU of the PDUs expected in sequence.

For example, the sequence number associated with the PDU of the PDUs expected in sequence is 35, the sequence number associated with the PDU lost during the data transfer is 32 and the sequence number in the poll request is 36. An increment of the sequence number 35 of a PDU expected in sequence may correspond to a sequence number 36. An increment in the sequence number 36 in the poll request may correspond to 37. The sequence number associated with the PDU of the PDUs expected in sequence may then be updated to sequence number 37 based on the comparison, since the sequence number 37 is greater than the sequence number 36. The status reporting range may then include the PDUs from sequence numbers 32 to 36 and the sequence number 37 may be excluded from the status reporting range.

In an exemplary implementation, the sequence number in the poll request is validated. If the sequence number in the poll request is less than the lower limit of the status reporting range, then the sequence number in the poll request is invalidated. The sequence number in the poll request may be less than the lower limit of the status reporting range due to, but not limited to, a delay in receipt of the poll request, repeated automatic poll requests, reordered delivery of the poll request and delayed processing of the poll request. The status reporting range may then include the PDUs with sequence numbers from the lower limit to the sequence number associated with the PDU expected in sequence, if the sequence number in the poll request is invalidated.

The sequence number associated with the PDU of the PDUs expected in sequence may be excluded from the status reporting range. The upper limit of the status reporting range may then correspond to a PDU with a sequence number that is one number less than the sequence number associated with the PDU of the PDUs expected in sequence.

For example, the sequence number associated with the PDU of the PDUs expected in sequence is 35, the sequence number associated with the PDU lost during the data transfer is 32 and the sequence number in the poll request is 31. The status reporting range may then include the PDUs from sequence numbers 32 to 34, since the sequence number 31 in the poll request is invalidated.

Referring to FIG. 3, in step 320, the status report with status information on the receipt or the loss of the PDUs within the status reporting range is provided.

In an exemplary implementation, a positive Acknowledgement (ACK) is transmitted corresponding to the receipt of the PDUs and a Negative Acknowledgement (NACK) is transmitted on loss of the PDUs. The PDUs lost during the data transfer may be retransmitted based on the NACK.

In an exemplary embodiment of the present invention, the status report may be provided based on the validation of the sequence number in the poll request.

Moreover, the status report with the status information on the loss of the PDUs in the extended status reporting range may also be provided based on the update of the sequence number of the PDU expected in sequence.

The method stops in step 325.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a status report, the method comprising:
    receiving, by a receiver, a poll request through a control protocol data unit or control protocol data unit containing a POLL SUper FIeld (POLL_SUFI) for the status report on at least one protocol data unit transmitted from a transmitter, wherein the poll request includes a first sequence number and does not include a data protocol data unit;
    updating, by the receiver, a second sequence number to one ahead of the first sequence number, if the first sequence number is larger than the second sequence number;
    determining, by the receiver, the status report by using the updated second sequence number; and
    transmitting, by the receiver, the status report by using the updated second sequence number to the transmitter,
    wherein the first sequence number is one less than a sequence number of a next protocol data unit to be transmitted for a first time from the transmitter to the receiver after the transmission of the poll request,
    wherein the second sequence number is the highest sequence number of a protocol data unit expected to be received in the receiver, and
    wherein the determining of the status report comprises:

if the first sequence number is greater than the second sequence number, determining a status reporting range for the status report based on the first sequence number; and if the second sequence number is greater than the first sequence number, determining a status reporting range for the status report based on the updated second sequence number.

2. The method of claim 1, wherein the determining of the status reporting range comprises:

determining an upper limit of the status reporting range based on the first sequence number or the updated second sequence number; and determining a lower limit of the status reporting range by using a third sequence number associated with a lost protocol data unit of the at least one protocol data unit.

3. The method of claim 1, further comprising:

updating the second sequence number so as to be incremented by one, if the first sequence number is less than the second sequence number.

4. The method of claim 3, further comprising:

extending the status reporting range based on the updated second sequence number; and transmitting the status report in the extended status reporting range.

5. The method of claim 1, further comprising:

validating the first sequence number; and transmitting the status report based on the validated first sequence number.

6. A system for transmitting and receiving a status report, the system comprising:

a transmitter for transmitting a poll request through a control protocol data unit or control protocol data unit containing a POLL SUper FIeld (POLL_SUFI) for the status report on at least one protocol data unit transmitted by the transmitter, wherein the poll request includes a first sequence number and does not include a protocol data unit; and a receiver for receiving the poll request, for updating a second sequence number to one ahead of the first sequence number, if the first sequence number is larger than the second sequence number, for determining the status report by using the updated second sequence number, and for transmitting the determined status report to the transmitter, wherein the first sequence number is one less than a sequence number of a next protocol data unit to be transmitted for a first time from the transmitter to the receiver after the transmission of the poll request, wherein the second sequence number is the highest sequence number of a protocol data unit expected to be received in the receiver, wherein if the first sequence number is greater than the second sequence number, the receiver determines a status reporting range for the status report based on the first sequence number and if the second sequence number is greater than the first sequence number, the receiver determines a status reporting range for the status report based on the updated second sequence number.

7. A receiver for transmitting a status report on at least one protocol data unit, the receiver comprising:

a communication interface for communicating with a transmitter; and a processor for receiving a poll request for the status report, for updating a second sequence number to one ahead of a first sequence number, if the first sequence number is larger than the second sequence number, for determining the status report by using the updated second sequence number, and for transmitting the determined status report to the transmitter, wherein the poll request includes the first sequence number and does not include a protocol data unit, wherein the first sequence number is one less than a sequence number of a next protocol data unit to be transmitted for a first time from the transmitter to the receiver after the transmission of the poll request, wherein the second sequence number is the highest sequence number of a protocol data unit expected in the receiver, wherein if the first sequence number is greater than the second sequence number, the processor determines a status reporting range for the status report based on the first sequence number and if the second sequence number is greater than the first sequence number, the processor determines a status reporting ranqe for the status report based on the updated second sequence number.

8. The receiver of claim 7, further comprising a storage unit for storing the at least one protocol data unit transmitted in sequence from the transmitter.

* * * * *